United States Patent
Coffy et al.

(10) Patent No.: US 6,920,557 B2
(45) Date of Patent: Jul. 19, 2005

(54) SYSTEM AND METHOD FOR WIRELESS USER INTERFACE FOR BUSINESS MACHINES

(75) Inventors: Jean-Hiram Coffy, Norwalk, CT (US); Edilberto I. Salazar, Brookfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 306 days.

(21) Appl. No.: 10/064,294

(22) Filed: Jun. 28, 2002

(65) Prior Publication Data

US 2004/0003256 A1 Jan. 1, 2004

(51) Int. Cl.[7] .................................................. H04L 9/00
(52) U.S. Cl. ...................... 713/159; 713/168; 713/171; 713/184; 713/185; 713/186; 705/60; 705/67; 705/72; 380/261; 380/262; 380/270
(58) Field of Search .............................. 705/60, 67, 72; 713/159, 168, 171, 184, 185, 186; 380/261, 262, 270

(56) References Cited

U.S. PATENT DOCUMENTS

| | | | |
|---|---|---|---|
| 4,988,981 A | 1/1991 | Zimmerman et al. | 345/158 |
| 5,327,160 A | 7/1994 | Asher | 345/156 |
| 5,371,553 A | 12/1994 | Kawamura et al. | 348/734 |
| 5,437,010 A | 7/1995 | Blackman et al. | 395/161 |
| 5,450,079 A | 9/1995 | Dunaway | 341/23 |
| 5,457,478 A | 10/1995 | Frank | 345/158 |
| 5,495,077 A | 2/1996 | Miller et al. | 178/18.06 |
| 5,561,446 A | 10/1996 | Montlick | 345/173 |
| 5,666,530 A | 9/1997 | Clark et al. | 395/617 |
| 5,684,706 A | 11/1997 | Harman et al. | 364/464.16 |
| 5,703,623 A | 12/1997 | Hall et al. | 345/158 |
| 5,729,220 A | 3/1998 | Russell | 341/22 |

(Continued)

FOREIGN PATENT DOCUMENTS

| | | |
|---|---|---|
| EP | 1 045 302 A1 | 10/2000 |
| EP | 1 069 500 A1 | 1/2001 |
| WO | WO 01/41483 A1 | 6/2001 |

OTHER PUBLICATIONS

Communication Ubiquity Enables Ubiquitous Control—Brad A. Myers and Jeffrey Nichols; dated Nov. 27, 2001, accessed on Internet Jun. 28, 2002.

Floor Control in a Highly Collaborative Co–Located Task—Brad A. Myers, Yu Shan A. Chuang, Marsha Tjandra, Mon–chu Chen, and Chun–Kwok Lee, undated, accessed on Internet Jun. 28, 2002 at http://www.cs.cmu.edu/~pebbles.

Generating Remote Control Interfaces for Complex Appliances—Jeffrey Nichols, Brad A. Myers, Michael Higgins, Joseph Hughes, Thomas K. Harris, Roni Rosenfeld, Mathilde Pignol, undated, accessed on Internet Jun. 28, 2002 at http://www.cs.cmu.edu/~pebbles..

(Continued)

*Primary Examiner*—Gregory Morse
*Assistant Examiner*—Paul E. Callahan
(74) *Attorney, Agent, or Firm*—George M. Macdonald; Angelo N. Chaclas; Charles R. Malandra

(57) ABSTRACT

A method and system for providing external user interfaces is described. In one configuration a co-located external processor and a business machine negotiate a communications connection. The co-located external processor then utilizes a server to determine a shared secret in order to pair a wireless connection with the business machine in order to act as the user interface for the business machine. In another configuration, the co-located external processor is connected to a remote data center that authenticates the user and provides the user interface code and secret pairing information to the co-located external processor. In another configuration, the co-located external processor performs data processing for providing a cryptographically processed print stream to a postage meter.

14 Claims, 8 Drawing Sheets

U.S. PATENT DOCUMENTS

| | | | |
|---|---|---|---|
| 5,742,683 A | 4/1998 | Lee et al. | 380/23 |
| 5,812,991 A | 9/1998 | Kara | 705/410 |
| 5,906,657 A | 5/1999 | Tognazzini | 709/248 |
| 5,935,221 A | 8/1999 | Felmus et al. | 710/10 |
| 6,005,945 A | 12/1999 | Whitehouse | 380/51 |
| 6,016,476 A | 1/2000 | Maes et al. | 705/1 |
| 6,019,281 A | 2/2000 | Emmett et al. | 235/375 |
| 6,020,881 A | 2/2000 | Naughton et al. | 345/327 |
| 6,081,795 A | 6/2000 | Ryan, Jr. | 705/408 |
| 6,085,181 A | 7/2000 | Gravell et al. | 705/408 |
| 6,127,941 A | 10/2000 | Van Ryzin | 340/825.69 |
| 6,141,688 A | 10/2000 | Bi et al. | 709/227 |
| 6,144,950 A | 11/2000 | Davies et al. | 705/401 |
| 6,151,590 A | 11/2000 | Cordery et al. | 705/60 |
| 6,202,057 B1 | 3/2001 | Pierce | 705/408 |
| 6,209,034 B1 | 3/2001 | Gladwin et al. | 709/227 |
| 6,223,029 B1 | 4/2001 | Stenman et al. | 455/420 |
| 6,243,682 B1 | 6/2001 | Eghtesadi et al. | 704/270 |
| 6,249,777 B1 * | 6/2001 | Kara et al. | 705/404 |
| 6,266,055 B1 | 7/2001 | Mozdzer et al. | 345/333 |
| 6,295,359 B1 | 9/2001 | Cordery et al. | 380/44 |
| 6,307,571 B2 | 10/2001 | Mozdzer et al. | 345/762 |
| 6,341,274 B1 | 1/2002 | Leon | 705/410 |
| 6,374,306 B1 | 4/2002 | Tognazzini | 709/248 |
| 6,407,779 B1 | 6/2002 | Herz | 348/734 |
| 2001/0000433 A1 | 4/2001 | Russell | 341/20 |

OTHER PUBLICATIONS

Personal Interfaces in Ubiquitous Environments—Position paper for the CHI'2001 Workshop on Building the Ubiquitous Computing User Experience—Jeffrey Nichols, Brad A. Myers and Rob Miller, undated, accessed Jun. 28, 2002.

Requirements for Automatically Generating Multi–Modal Interfaces for Complex Appliances—Jeffrey Nichols, Brad Myers, Thomas K. Harris, Roni Rosenfeld, Stefanie Shriver, Michael Higgins and Joseph Hughes, undated, accessed on Internet Jun. 28, 2002 at http://www.cs.cmu.edu/~pebbles.

Studying The Use of Handhelds to Control Everyday Appliances—Jeffrey Nichols and Brad A. Myers, undated, accessed on Internet Jun. 28, 2002 at http://www.cs.cmu.edu/~pebbles.

User Interfaces that Span Hand–Held and Fixed Devices—Position paper for the CHI'2001 Workshop on Distributed and Disappearing User Interfaces in Ubiquitous Computing—Brad A. Myers, Jeff Nichols and Rob Miller, undated, accessed Jun. 28, 2002.

* cited by examiner

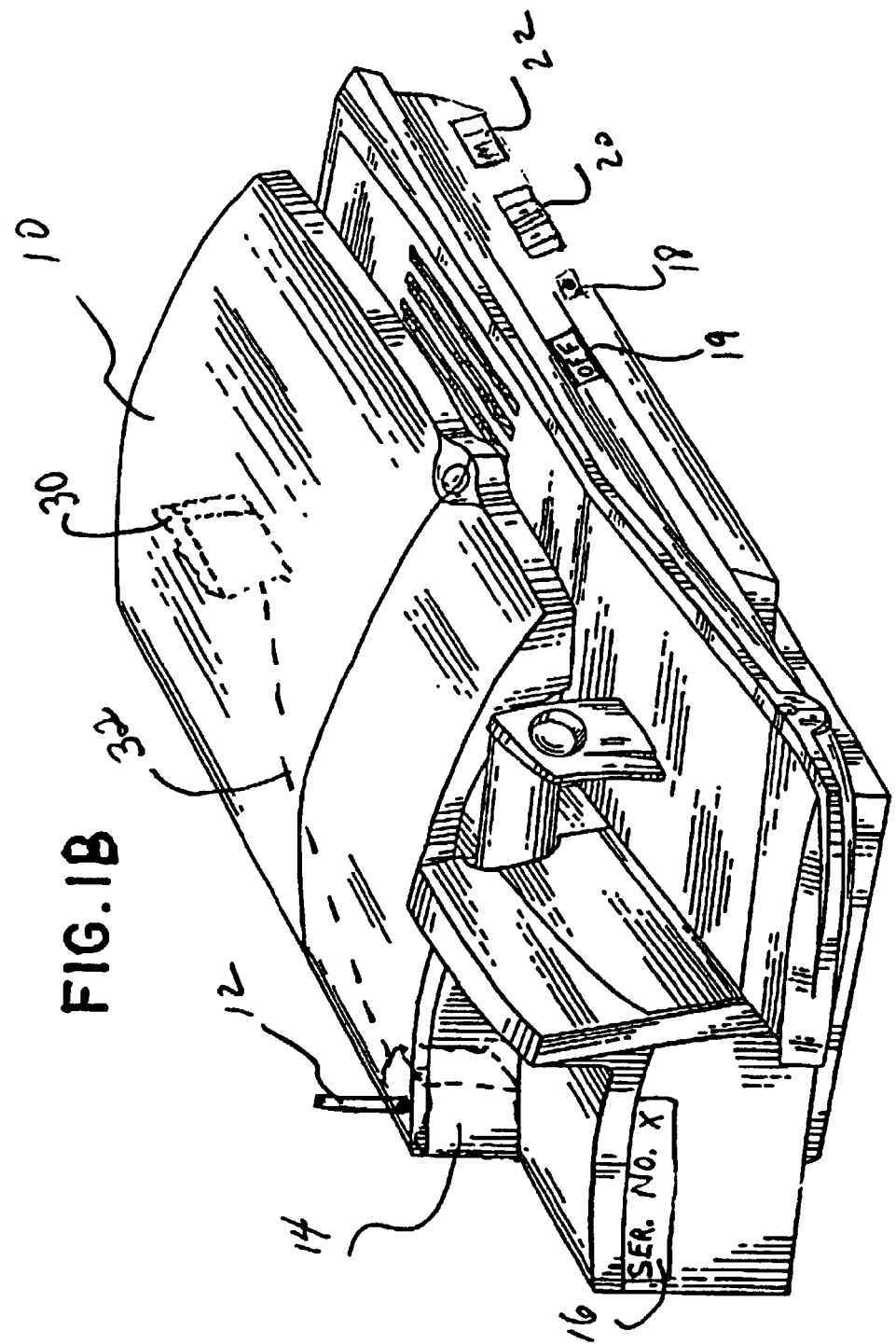

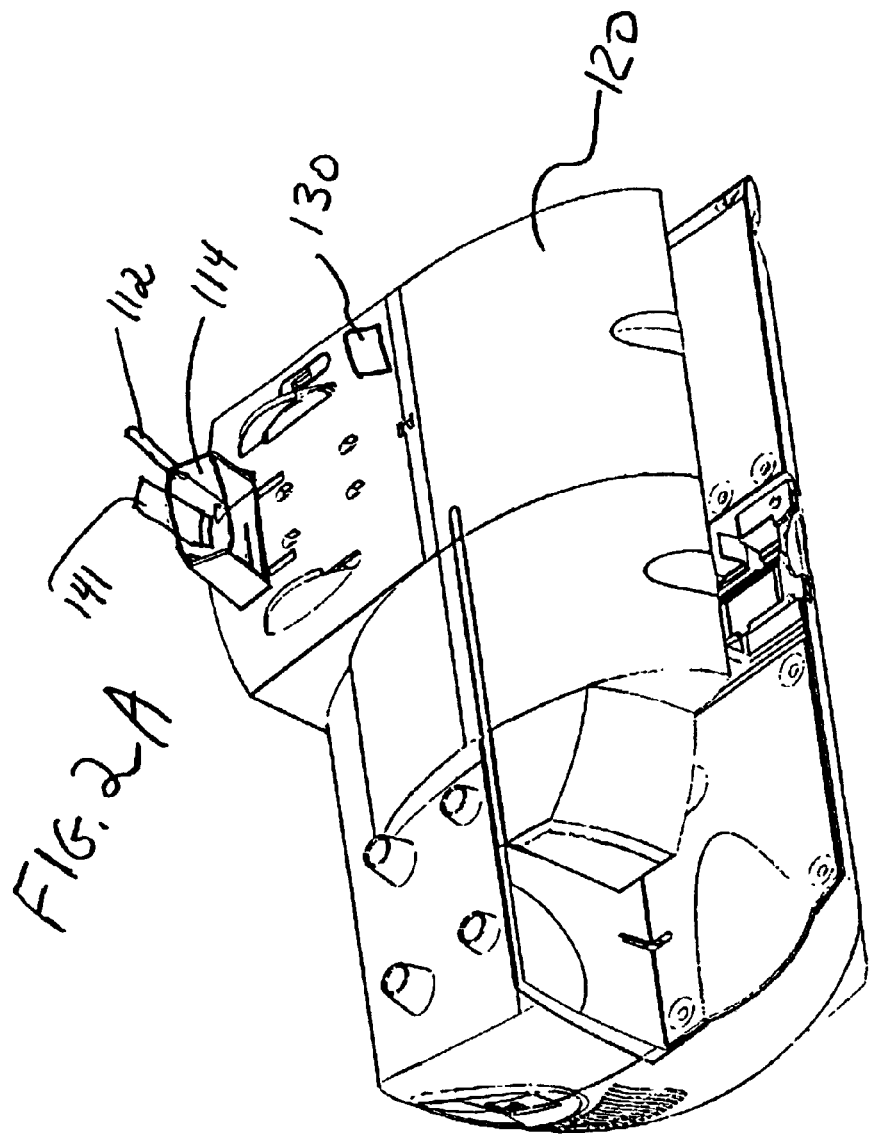

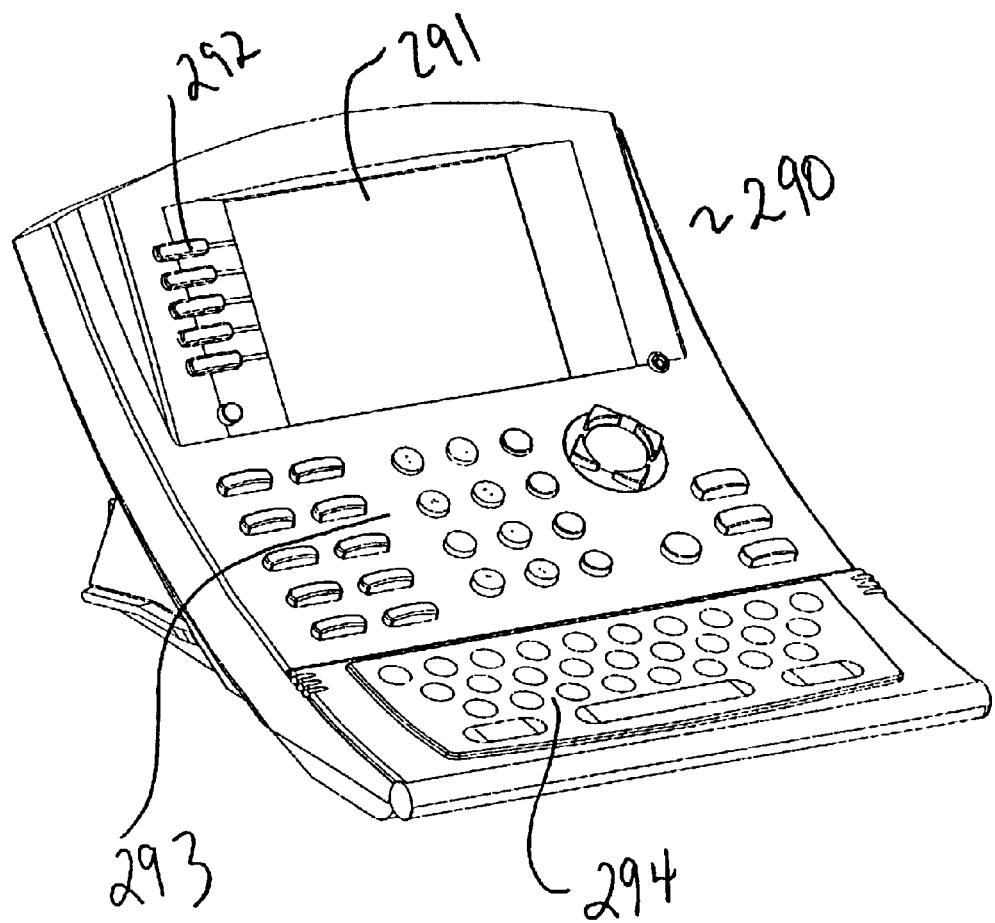

SYSTEM AND METHOD FOR WIRELESS USER INTERFACE FOR BUSINESS MACHINES

CROSS REFERENCE TO RELATED APPLICATIONS

This application is related to commonly owned, co-pending U.S. patent application Ser. No. 10/064,293, filed on Jun. 28, 2002, entitled SYSTEM AND METHOD FOR SELECTING AN EXTERNAL USER INTERFACE USING SPATIAL INFORMATION, which is hereby incorporated by reference in its entirety.

BACKGROUND OF INVENTION

The illustrative embodiments disclosed in the present application are useful in systems including those for providing user interfaces for business machines and more particularly are useful in systems including those for providing interchangeable co-located wireless user interfaces for mailing machines having secure indicia print systems.

There are several categories of conventional business machines in ubiquitous use today. The typical large office environment may include centralized business machine centers that often include copy machines, facsimile machines, printers, and mailing machines. These environments may include postage meters, weighing scales and mail processing machines such as inserters, folders and sorters. Additionally, business machines may be found in satellite locations such as convenience centers in various locations. Furthermore, business machines may be located in individual offices and cubicles. In a typical small home office environment, business machines are often located in a single office and may include multi-function business machines such as a combined printer/scanner/copier/facsimile unit.

Business machines are also found in other environments such as production mail facilities and copy centers. Multi-user settings often utilize business machine usage accounting systems for tracking usage of the business machines according to various criteria. The criteria could include a user identification number, a client identification number and/or a particular matter identification number. The usage accounting systems typically employ a separate accounting processor connected to the business machine having a separate user interface.

Mailing machines are commercially available from Pitney Bowes Inc. of Stamford, Conn. Mailing machines are available in a range of units having increasing functionality. A mailing machine may include a variety of modules or sub-systems for performing tasks such as singulating mailpieces from a stack, weighing a mailpiece, sealing the flap of an envelope, applying evidence of postage, printing information on the mailpiece, accounting for postage used, printing labels and stacking finished mailpieces. The mailing machine often includes a transport mechanism for feeding mailpieces through successive stages of the mailing machine. Mailing machines may include a postage meter that may account for and apply evidence of postage used for a mailpiece. A typical mailing machine will include various software modules for performing functions such as machine control, accounting and reporting functions. Certain mailing machines have multiple features and are configured so that the mailing machine may be provided with only a subset of the features enabled. Such a mailing machine would typically require that the user interface support all of the features of the machine.

Additionally, certain users may be experienced in the operation of a particular mailing machine and may not require an elaborate user interface. However, certain users may require a more elaborate user interface and the typical mailing machine provides a sufficiently elaborate user interface for use by both the experienced and novice user. Accordingly, a user interface may be more complicated than a particular user requires it to be.

SUMMARY OF INVENTION

The present application describes a system for providing a wireless external user interface for a business machine.

In one illustrative embodiment, a business machine includes a user interface wireless access transceiver for providing a user interface utilizing an external user interface processor, wherein display information is sent to the external user interface processor and input is received from the external user interface processor. In a further embodiment, the user interface access system includes a system for authenticating access clearance for a particular external user interface and the user of the external user interface. The user interface access system may require third party access clearance of the external user interface processor utilizing cryptographic keys. Furthermore, access clearance may be limited to a particular serial number or range of serial numbers of the business machine. In a further embodiment, biometric user authentication is required and customizable user macros may be stored locally on the external user interface processor.

In another illustrative embodiment, a mailing machine having an internal postal security device includes a user interface wireless access transceiver for providing a user interface utilizing an external user interface processor. The user interface access system may also include a system for authenticating access clearance and may be paired with the mailing machine. In another embodiment, the postal security device is removable.

In another illustrative embodiment, a mailing machine having an external postal security device includes a user interface wireless access transceiver for providing a user interface utilizing an external user interface processor, wherein the postal security device is operatively connected to the external user interface processor. In another embodiment, the mailing machine has an interface port for connecting to an interchangeable postal security device.

BRIEF DESCRIPTION OF DRAWINGS

FIG. 1B is a perspective view of a mailing machine having an integral user interface wireless access system according to an illustrative embodiment of the present application.

FIG. 2A is a perspective view of a mailing machine having a removable user interface wireless access system according to another illustrative embodiment of the present application.

FIG. 2C is a perspective view of a wired removable user interface system according to another illustrative embodiment of the present application.

DETAILED DESCRIPTION

Figure 1A:
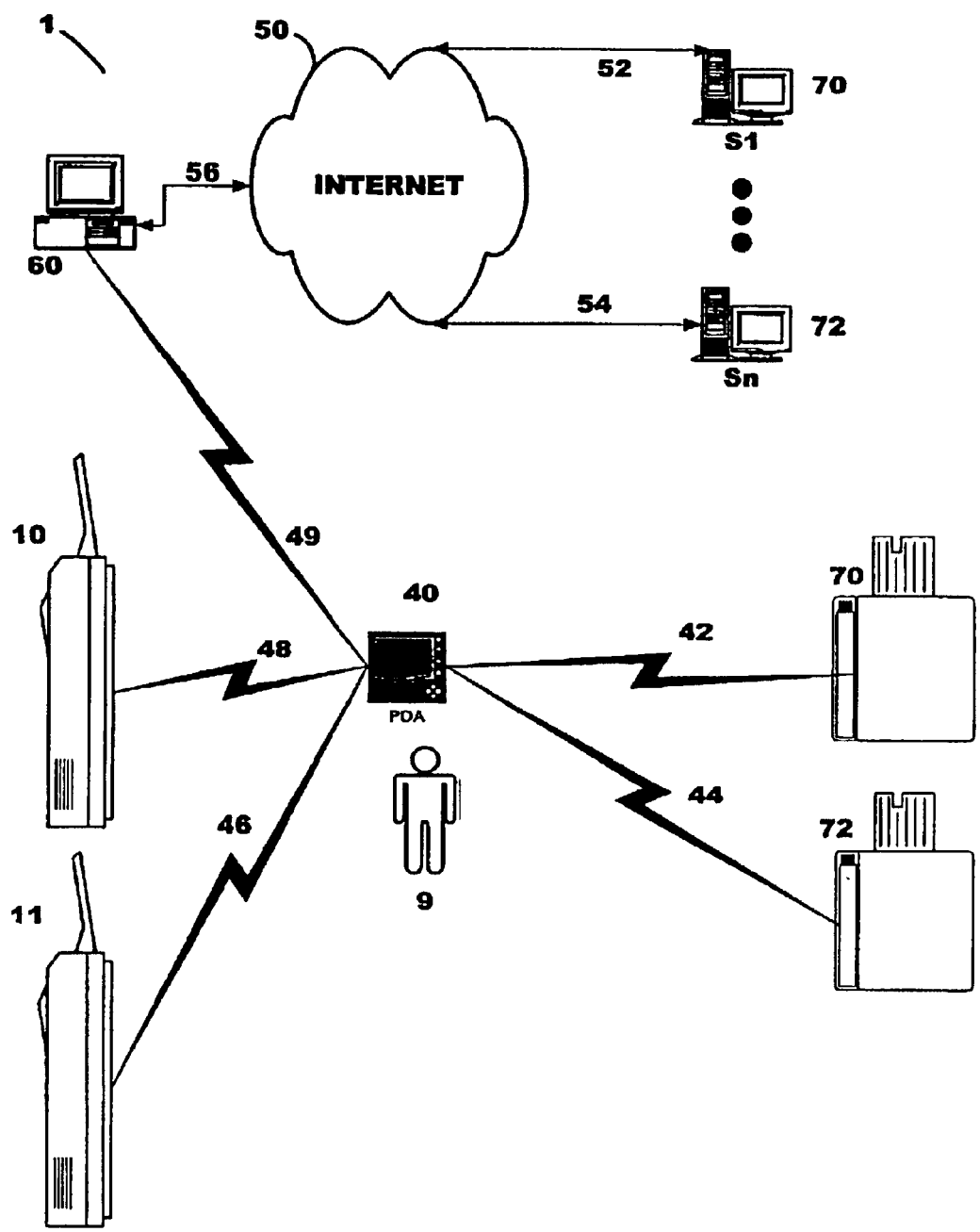
FIG. 1A is a schematic representation of an external user interface information system according to an illustrative embodiment of the present application.
Figure 1C:
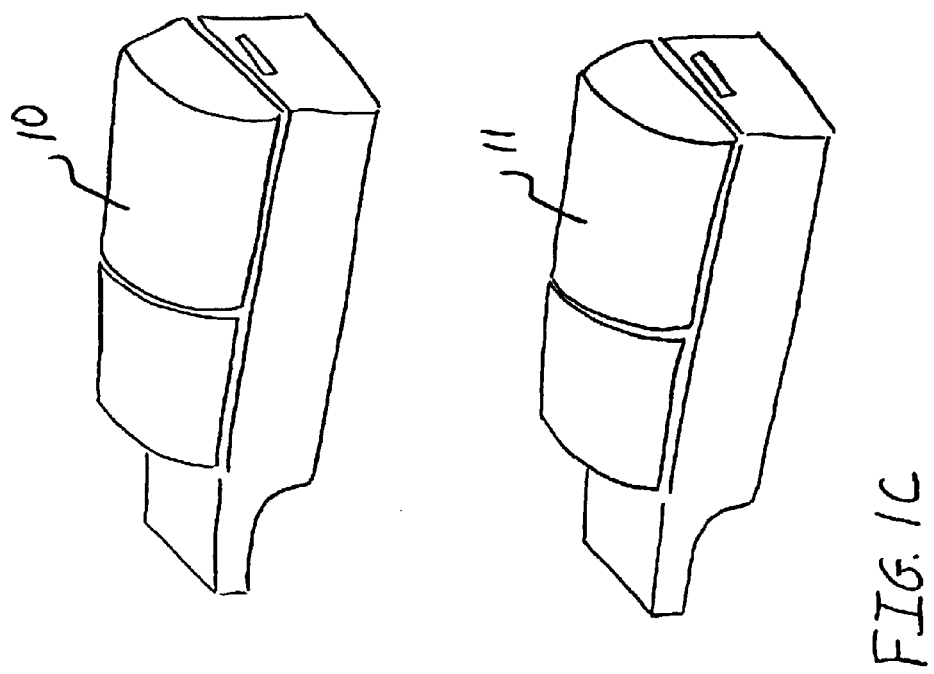
FIG. 1C is a schematic representation of an external user interface information system for controlling mailing machines according to an illustrative embodiment of the present application.
Figure 1C:
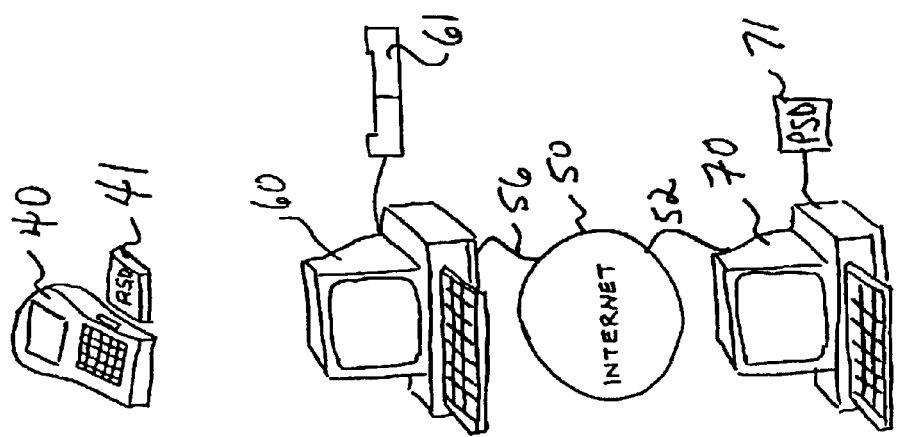

Referring to FIG. 1, a first illustrative embodiment describing an external user interface information system 1 is described.

Mailing machines are often utilized in a crowded mailroom environment. For example, several of the same type of mailing machines may be present in a relatively small area such as a mailroom. Wireless network devices are available that allow portable computers to access a network using wireless protocols such as Bluetooth™. Additional systems compliant with hardware layer protocols such as the versions of the IEEE 802.11 are available as well as systems such as Wi-Fi compliant systems. Typical wired network interface cards (NIC) utilize the Ethernet protocol in which each individual Ethernet card produced is assigned a unique address. An address issuing authority ensures that the addresses assigned to the various manufacturers are unique. Bluetooth™ systems do not generally require user intervention to connect to the Personal Area Network access point.

Control of Multiple Mailing Machines

Handheld computer 40 utilizes a wireless communications channel such as a Bluetooth™ network 42, 44, 46, 48, and 49 to communicate with business machines 10, 11, 70, and 72 and also communicates with server 60.

Wireless systems such as 802.11 b sometimes utilize WEP encryption to encrypt packets as they are sent over the open airways and subject to snooping. Such WEP techniques may not provide adequate protection of the underlying data. Bluetooth™ utilizes several layers of security. At a link level, remote/local device authentication is required before any communication can take place. This system may be subject to identity or pin attacks. At the Channel level, a link level connection occurs and then the devices need to authenticate before an communications channel is established. Finally, there is optional Bluetooth™ encryption of the data payload being transmitted.

In this embodiment, server 60 is connected to the Internet using connection 56 and third-party servers S1 70 through Sn 72 are connected to the Internet using 52, 54 respectively. Server 60 could provide gateway access to the TCP/IP Internet network.

Mailing machines 10 and 11 are in proximity to handheld 40 and user 9. The business machines do not have user interfaces, except for a power switch and/or emergency off button. In an alternative, one or more of the business machines include a user interface that is preempted by the handheld processor 40.

Referring to FIG. 1B, mailing machine 10 includes a serial number label 16, emergency off button 19, infrared transceiver 18, identification bar code 20, identification machine name plate 22. Additionally, the mailing machine includes a Bluetooth™ transceiver and controller 14 having antenna 14 that interfaces with the mailing machine control logic (not shown). Furthermore, the user interface access portion of 14 is connected to the secure print processor 30 using secure connection 32.

Referring to FIG. 1C, a handheld processor 40 has an access port for a postal security device 41. Mailroom server computer 60 includes a docking cradle 61 for the handheld computer 40. Alternatively, the docking connection is wireless. Server 60 is connected to the Internet 50 using a T1 line 56 and mailing data center processor 70 includes a postal security device 71 having a funds vault and is connected to the Internet 50 using T1 line 52.

Mailing machines 10 and 11 are co-located in the mailroom and are equipped as shown in FIG. 1B.

Additionally, other appropriate wireless and wired networks and connections may be utilized. As can be appreciated, various communication flows may be utilized, some of which will be chattier than others.

Here, it is contemplated that different portable processors may be utilized in the system. Accordingly, the machines or user interface servers utilize the capabilities of the portable processor to determine what user interface logic to present to a user. Additionally, user preferences could be utilized to pre-configure the user interface and the user may be allowed to store personal macros for each type of machine that is to be operated. It is understood that a portable computer used as an external user interface may store more than one user interface logic program that could then each be selected when necessary.

User Interface

Referring to FIG. 2A, mailing machine 120 includes a removable wireless user interface access system 114 having antenna 112 and a connector for a postal security device 141. Similarly, it includes a secure printing processor 130 connected to the machine logic in a secure manner.

Figure 2B:
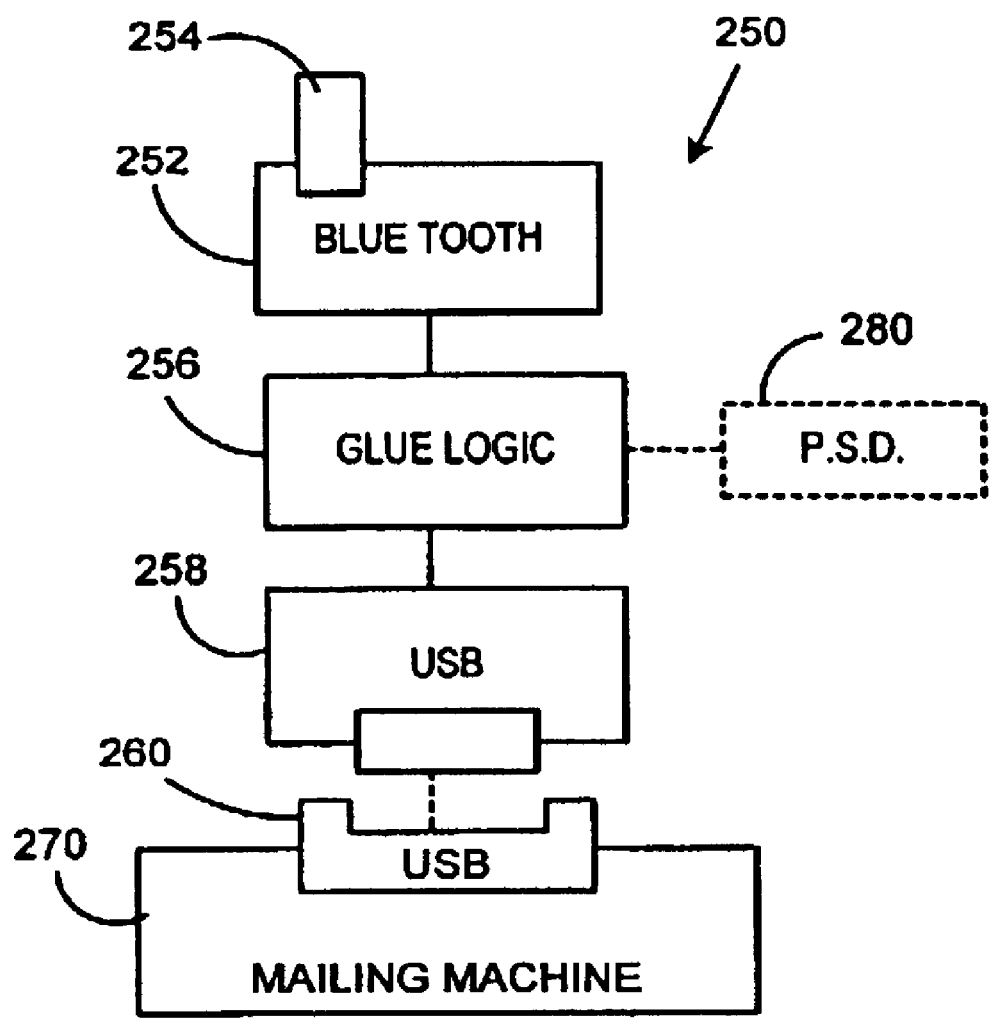
FIG. 2B is a schematic representation of a removable user interface wireless access system as it docks with a mailing machine according to another illustrative embodiment of the present application.

Referring to FIG. 2B, a removable wireless user interface access 250 is shown. Antenna 254 and Bluetooth™ processor and transceiver 252 connect to glue logic 256 and USB interface 258 into docking cradle 260 to provide required USB and control signals to mailing machine 270.

Referring to FIG. 2C, a removable wired user interface access 290 is shown. Mailing machine user interface functions and certain mailing machine controller functions are performed in the device. Here, the external wireless user interface will provide the user interface and processing function of 290. Display 291, function keys 291, primary keys 293 and keyboard 294 may be emulated or replaced by another layout.

Control of Multiple Mailing Machines

Figure 3:
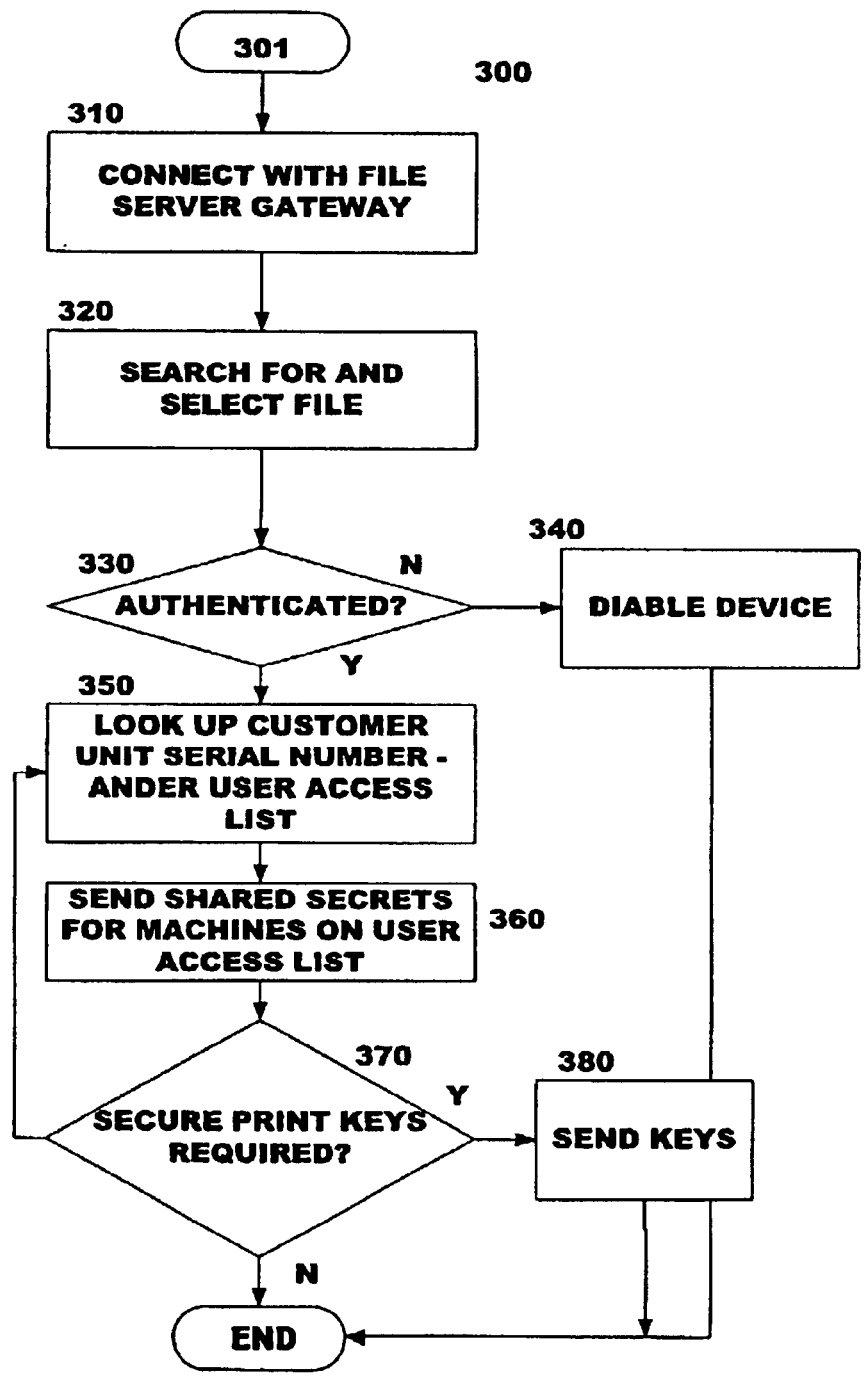
FIG. 3 is a flow chart showing a process for selecting a wireless external user interface according to another illustrative embodiment of the present application.

Referring to FIG. 3 and FIG. 1C, the process for pairing an external user interface to a mailing machine is described.

Postage meters may be characterized as operating in an open meter manner or a closed meter manner. A typical closed system postage meter includes a dedicated printer for printing evidence of postage used. A typical open system meter may utilize a general-purpose printer. Postal funds are often stored in a postal security device (PSD) that may employ a secure accounting vault. For example, a reference directed toward a Network Open Metering System is described in U.S. Pat. No. 6,151,590, issued Nov. 21, 2000 and incorporated herein by reference. A reference directed toward a Postage Metering System and Method for a Closed System Network is described in U.S. Pat. No. 6,081,795, issued Jun. 27, 2000 and incorporated herein by reference. A reference directed toward a Postage Metering System and Method for Single Vault Dispensing Postage to a Plurality of Printers, is described in U.S. Pat. No. 6,202,057, issued Mar. 13, 2001 and incorporated herein by reference.

Referring to FIG. 3, in step 310, the server receives the handheld processor in a docking station. The server connects to mail data center 50 through a secure Internet connection.

In step 320, the user is authenticated using a customer number and password. Alternatively, the user could be authenticated using biometrics and the handheld could be authenticated using its unique Bluetooth 48 bit MAC address.

Accordingly, each user is only provided the shared secrets for the machines that he is allowed access to. The shared secrets are set to time out and require periodic authentication such as every day or after a period of inactivity such as one hour, or after the handheld device is removed from the Personal Area Network area. Accordingly, access to the shared secrets is controlled. Here, the user can be presented with a list of available machines, or the user could use the visual identifier on the machine M1 22, to select the machine. Alternatively, the handheld could scan bar code 20 to identify the machine or establish an infrared connection for identification with port 18. Furthermore, the user may be prompted for machine serial number 16. Accordingly, the user could selectively control one machine of a group of like machines by selecting a human readable identifier without knowing a device pin or shared secret.

In an alternative, the user is provided access to only those features that are purchased and enable for each separate mailing machine that the user has access to by querying the mail center database for a list of installed features.

Secure Printing

Figure 4:
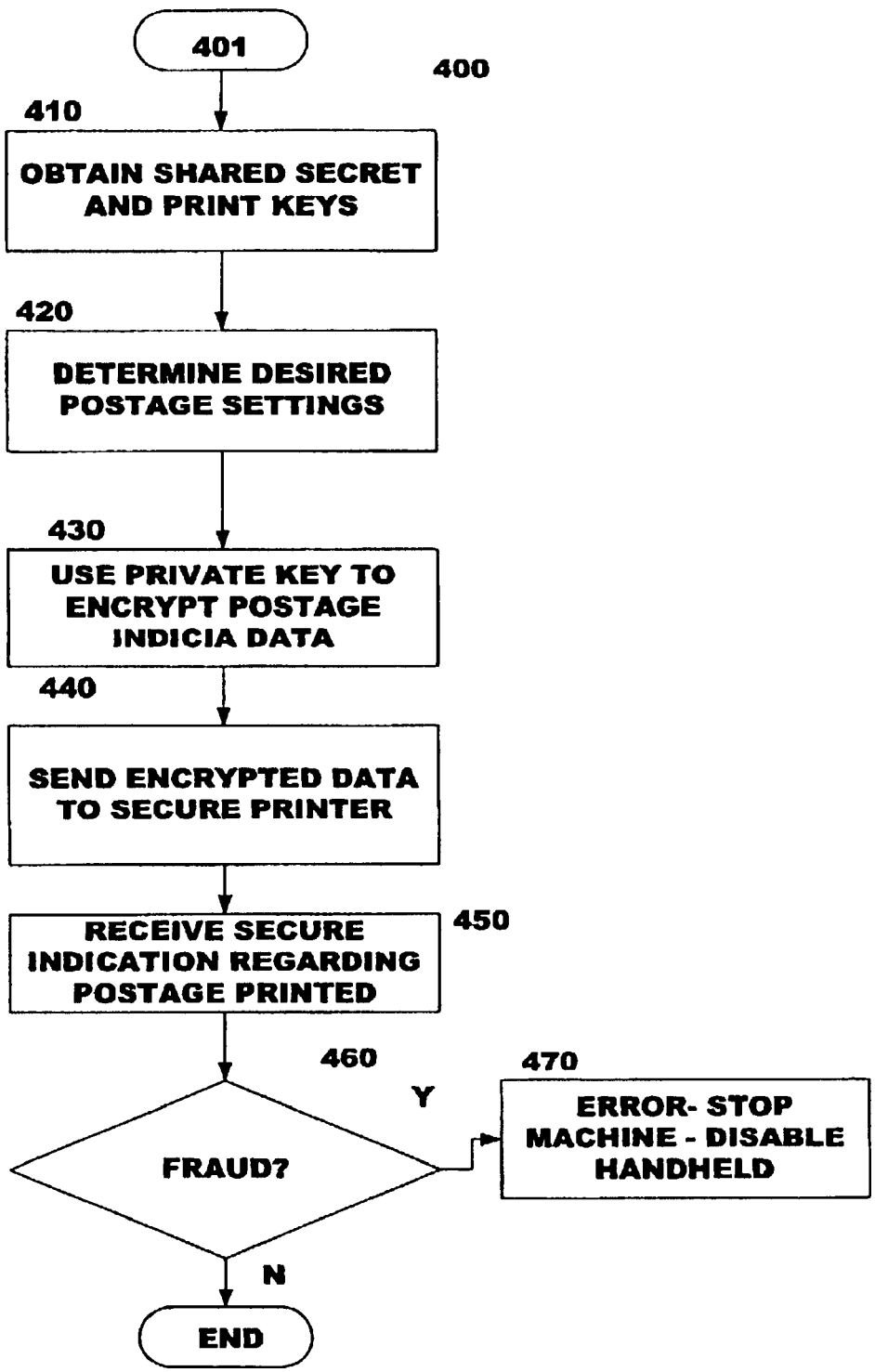
FIG. 4 is a flow chart showing a process for controlling two mailing meters from a single wireless controller and postal security device according to another illustrative embodiment of the present application.

Referring to FIG. 4 and FIG. 1B, the process for a second level encryption of the wireless data is described. Here, in the secure printing feature and private key exchange is used to detect any fraud. In process 400, the process starts at step 401. In step 410, the user is authenticated and obtains shared secret and print/data keys for all machines that the user has access to.

In an alternative, the user is only provided the secret information for one machine at a time. There is then an authenticated and paired user interface controller and a headless mailing machine having a wireless user interface access system. In step 420, the user determines the desired postage using the user interface controller. It is to be appreciated that the user interface controller performs the functions of device 290 and can have access to wireless enabled scales, etc. The user interface controller then processes the required postage and control commands to be sent to the mailing machine.

In step 430, he user interface controller uses the private print/data key to encrypt postage indicia information with security data. In step 440, the encrypted data is sent to the secure printer and used. Over the secure channel, the secure printer returns a secure authenticating message regarding the postage printed to detect fraud. In an alternative, the message is sent to the postal data center and compared to the postal security device value in real time or near real time to more quickly determine a fraud condition.

In step 460 a fraud determination is made and if fraud is found, the user interface controller disables the mailing machine and the user interface controller. Alternatively, the mail data center can disable the mailing machine and/or the user interface controller.

Public Access

In another alternative, a mailing machine with a secure print processor could be made available to general members of the public at a public site such as a post office. Here, the customer handheld PDA, laptop or phone will use a secure connection to the mail data center to buy postage from a remote postage security device, download a secret key to pair to the mailing machine over the secure link to the mailing data center and a private key could be exchanged for communication between the handheld and mailing machine for command, control and secure graphics transfer for the indicia. The keys on the mailing machine can then be changed by the mail data center to enable the next use.

A method and system for providing external user interfaces is described. In one configuration a co-located external processor and a business machine negotiate a communications connection. The business machine stores at least one version of a user interface program in JAVA code that it transmits to the co-located external processor. The co-located external processor then utilizes the user interface to communicate commands to the business machine. In another embodiment, the co-located external processor is connected to a data center that authenticates the user and provides the user interface code and secret pairing information to the co-located external processor. In another configuration, the co-located external processor obtains line-of site data from the business machine in order to determine which machine to establish a pairing connection with.

A system for a wireless mailroom having a gateway server to allow remote access is described in commonly owned U.S. patent application Ser. No. 10/021,583, filed Oct. 29, 2001 and incorporated herein by reference in its entirety. The embodiments of the present application utilize a network system and it is to be understood that segments or all of local networks described in the embodiments could be assigned individual global addresses. However, it is also possible that one or more gateways or proxy servers could be utilized so that a sub-network of many devices appears at a single address for each gateway from the perspective of a device on the network higher up the hierarchy chain.

A system for Postage Printing Including Prevention of Tampering With Print Data Sent From A Postage Meter To A Printer is described in commonly owned U.S. Pat. No. 6,144,950, issued Nov. 7, 2000 and incorporated herein by reference in its entirety. The embodiments described therein may be alternatively utilized with the embodiments of the present application.

A reference directed toward a Mailing Machine Disabling a Keyboard/Display of a Resident User Interface Which Has Function Keys and the Keyboard/Display if an External User Interface is Connected is described in U.S. Pat. No. 5,935,221 to Felmus, et al. and is incorporated herein by reference in its entirety. The Felmus patent describes a system for disabling the internal keyboard and display of a mailing machine in the presence of an external user interface. The embodiments described therein may be alternatively utilized with the embodiments described herein.

A reference directed toward a Universal Access Photocopier system is described in U.S. Pat. No. 6,243,682 to Eghtesadi, et al. and is incorporated herein by reference in its entirety. The Eghtesadi patent describes a system for providing voice control of a photocopier machine. The embodiments described therein may be alternatively utilized with the embodiments described herein.

In an alternative applicable to any of the embodiment, the external user interface may allow customization of each machine user interface logic program stored in the external processor. Here, the external processor may also store macros and other interface logic that is not typically provided in the user interface. For example, the external processor could provide accounting system features that are typically provided by another accounting processor that is attached to a copier and has a separate user interface. In another such alternative, the system utilizes SyncML over Bluetooth™ to ensure that the most recent or an acceptable version of the particular user interface being utilized is loaded in the portable computer.

In another alternative applicable to any of the embodiments, the external processor comprises a Wi-Fi capable hand-held pocket PC such as the Toshiba e740 Pocket PC. Furthermore, differing types of processors and logic systems may be supported. For example, JAVA based PALM OS devices may be utilized. The user interface logic could be provided in JAVA or PALM OS format. Similarly, other portable computing devices such as laptop computers, tablet computers and Windows CE based portable wireless capable computers could be utilized.

In another alternative applicable to any of the embodiments, the machine being controlled requires that the data being sent be cryptographically protected from tampering before being placed into any encrypted communications packet such as WEP. For example, the machine being controlled may include a mailing machine having a postage meter for printing indicia as evidence of postage paid. As described in the related application, the printer in the mailing machine may be secured using cryptographic techniques to avoid fraud attempts such as duplicate prints of the same indicia. Similarly, impersonation attacks should be dealt with in such a system.

The present application describes illustrative embodiments of a system and method for selecting an external user interface. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

What is claimed is:

1. A method for enabling an external processor to be used as a user interface for a machine by using an authentication server comprising:

establishing a data connection between the external processor and the authentication server;

providing user account data to the authentication server;

providing authentication data to the authentication server;

receiving appropriate secret information and logic enabling data from the authentication server relating to the user account data and the authentication data;

using the appropriate secret information and logic enabling data to establish a wireless data and user interface control connection between the external processor and the machine wherein the external processor and the machine are co-located in the same proximate location.

2. The method of claim 1 further comprising:

obtaining machine identification data, wherein the machine identification data identifies one machine among a plurality of machines; and using the machine identification data, the appropriate secret information and logic enabling data to establish a wireless data and user interface control connection between the external processor and the one machine wherein the external processor and the one machine are co-located.

3. The method of claim 1 wherein:

the authentication data comprises authentication data associated with the external processor.

4. The method of claim 1 wherein:

the authentication data comprises user biometric authentication data.

5. An external processing system for use as a user interface to a mailing machine comprising:

a processor;

memory connected to the processor, the memory storing a program for controlling the processor and storing user data;

a wireless communication system connected to the processor; and the processor operative with the program operative for: establishing a connection with an authentication server;

sending user data and authentication data to the authentication server and a request for machine access data;

receiving machine access data from the authentication server in response to the user data and the authentication; and establishing a wireless communication user interface link to the mailing machine using the machine access data.

6. The system of claim 5, further comprising:

a secure postage vault connected to the processor; and wherein:

the processor is further operative for:

cryptographically signing the user data using the secure postage vault.

7. The system of claim 6, wherein:

the machine access data includes a device authentication secret and a private data key.

8. The system of claim 5, wherein:

the wireless communication system comprises a BLUETOOTH transceiver.

9. The system of claim 5, further comprising:

a biometric data interface; and wherein:

the processor is further operative for: obtaining biometric data; and wherein, the authentication data comprises the biometric data.

10. The system of claim 5, wherein the authentication data comprises an identifier associated with the external processing system.

11. The system of claim 5, further comprising:

establishing a wireless communication user interface link to a plurality of mailing machines using the machine access data; and providing selection data to the user for the plurality of mailing machines.

12. The system of claim 5 further comprising:

a system for obtaining a machine identifier; and wherein:

the processor is further operative for:

obtaining a machine identifier; and wherein, the authentication data comprises the machine identifier.

13. A method for using a co-located external user interface having a wireless interface for printing indicia for evidencing postage using a mailing machine having a wireless interface in the same proximate location as the external user interface comprising:
  obtaining mailing machine access data;
  establishing a secure wireless communications connection with the mailing machine using the machine access data;
  obtaining a desired postage value;
  facilitating the accounting of the desired postage value;
  encrypting postage value data; and
  sending the encrypted postage value data to the mailing machine.

14. The method of claim 13 further comprising:
  receiving verification data confirming that the indicia was printed.

* * * * *